(No Model.) 2 Sheets—Sheet 1.

G. ANDROSS.
EYEGLASSES.

No. 452,824. Patented May 26, 1891.

WITNESSES
A. F. Langdon.
Albert H. Walker.

INVENTOR
George Andross, by
Harry P. Williams.
Attorney (No Model.) 2 Sheets—Sheet 2.

G. ANDROSS.
EYEGLASSES.

No. 452,824. Patented May 26, 1891.

Witnesses:
A. F. Langdon.
A. B. Jenkins.

Inventor,
George Andross, by
Harry P. Williams,
Atty.

United States Patent Office.

GEORGE ANDROSS, OF HARTFORD, CONNECTICUT.

EYEGLASSES.

SPECIFICATION forming part of Letters Patent No. 452,824, dated May 26, 1891.

Application filed October 3, 1890. Serial No. 366,961. (No model.)

*To all whom it may concern:*

Be it known that I, GEORGE ANDROSS, a citizen of the United States, residing at Hartford, in the county of Hartford and State of Connecticut, have invented certain new and useful Improvements in Eyeglasses, of which the following is a full, clear, and exact specification.

The invention relates to the class of glasses which are held before the eyes by a frame having parts that grasp the nose of the wearer; and the object is to provide such glasses with a frame constructed to grasp the nose in such manner as to firmly retain the glasses in place and allow them to be adjusted to various positions to fit eyes of different shapes and conditions or turn them from before the eyes without removing the frame from the nose.

Figure 1:
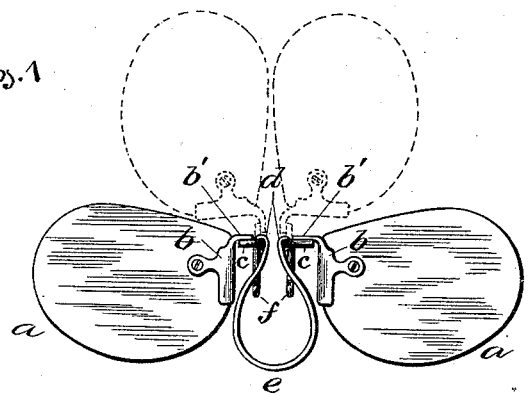
Figure 2:
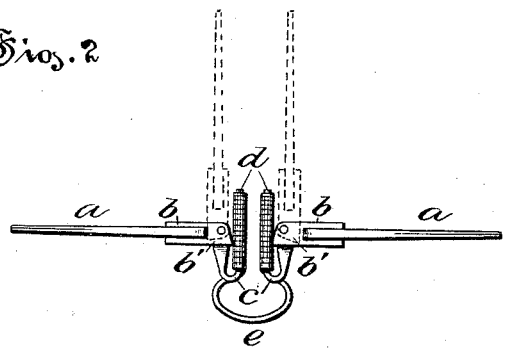
Figure 3:
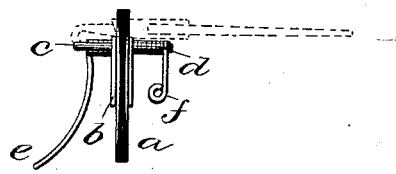
Figure 6:
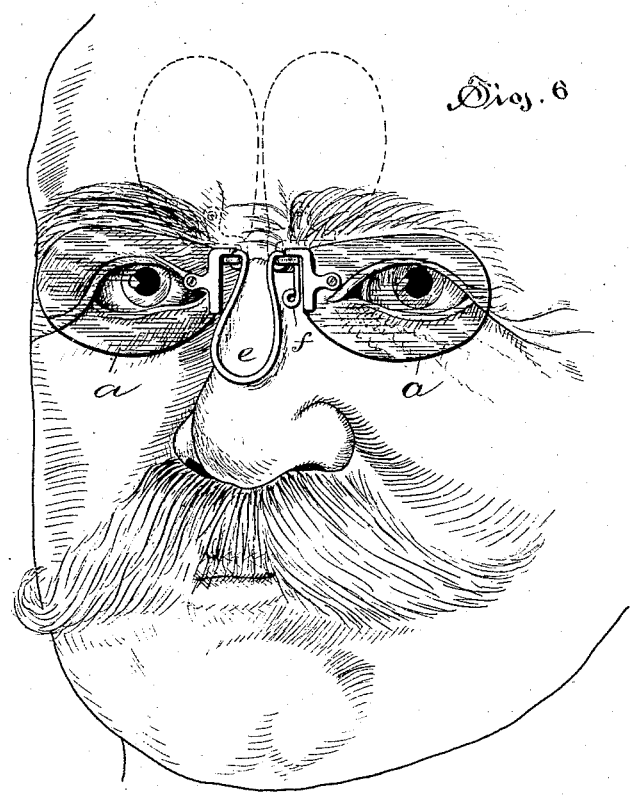
Figure 4:
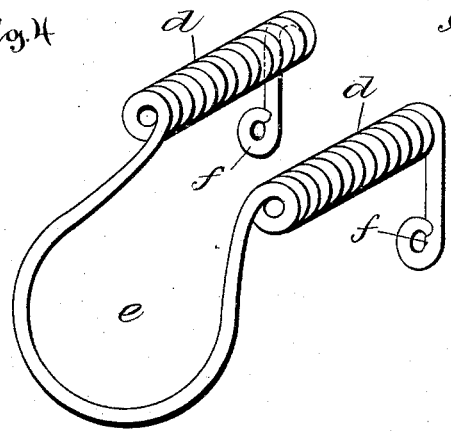
Figure 5:
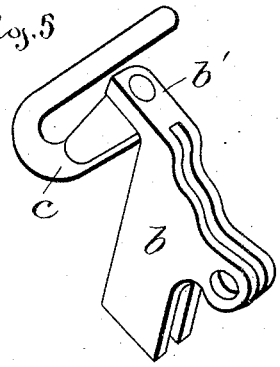

Referring to the accompanying drawings, Figure 1 is a front view of the glasses. Fig. 2 is a top edge view of the same, and Fig. 3 is a side edge view. Fig. 4 is a perspective view of the bow, spring, and clamping-arms. Fig. 5 is a detail perspective view of one of the clips, and Fig. 6 is a view illustrating the position of the parts when in use.

In the views, the letters $a$ indicate the lenses, which may be of any desired color or tint, cut to the required shape. These lenses may be held either by a continuous peripheral frame or by a skeleton frame formed of clips $b$, screwed or riveted to one edge of the lenses. A portion of these clips is bent outward, forming arms $b'$, and these arms are hinged, usually by pivots, to the flattened ends of the rods $c$, that are rotarily held by the cylinders $d$, preferably formed of coils of wire, the front of which is looped downward to form a spring-bow $e$, while the rear ends project downward, forming arms $f$, adapted to grasp the thin part of the nose between the eyes of the wearer and by friction hold the glasses in place, the bow $e$ projecting downward and resting upon the bridge of the nose. The arms $f$ grasp a portion of the nose between the eyes which is not as wedge-shaped as where the friction-pieces of the ordinary glasses clasp and hold the glasses more firmly in place, while the bow, resting upon the bridge of the nose, prevents the glasses from tipping forward.

When the glasses are in place for use, the lenses have a limited movement toward or from the eyes, the frame folding on the pivots that join the arms $b'$ and the rods $c$ until the ends of the arms which form stops come in contact with the cylinders, as shown in Fig. 2, so that the lenses may be adjusted parallel with the eyes of the user, and the rods $c$ have an oscillation in the cylinders $d$, so that the lenses also have a vertical movement to provide adjustment for eyes of various sizes and shapes or to allow the lenses to be turned up, as shown in dotted lines in Fig. 1, from in front of the eyes without removing the frame from the nose.

I claim as my invention—

1. An eyeglass consisting of lenses, frames attached to the lenses, a downward-looping bow pivoted to the frames, and arms attached to the bow and projecting downward in a different plane, substantially as specified.

2. An eyeglass consisting of lenses and frames attached to the lenses and pivoted to the rods hinged to the bow, substantially as specified.

3. An eyeglass consisting of lenses, frames attached to the lenses, a bow hinged to rods pivoted to the frames, and downward-projecting arms attached to the bow, substantially as specified.

4. An eyeglass consisting of lenses, frames attached to the lenses, a downward-projecting bow hinged to rods pivoted to the frames, and downward-projecting arms attached to the bow, substantially as specified.

GEORGE ANDROSS.

Witnesses:
HARRY R. WILLIAMS,
W. B. JENKINS.